US009338404B1

(12) United States Patent
Egeler et al.

(10) Patent No.: US 9,338,404 B1
(45) Date of Patent: May 10, 2016

(54) COMMUNICATION IN A VIRTUAL REALITY ENVIRONMENT

(71) Applicant: Verizon Patent and Licensing Inc., Arlington, VA (US)

(72) Inventors: Christian Egeler, Basking Ridge, NJ (US); David B. Murray, Fanwood, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/580,704

(22) Filed: Dec. 23, 2014

(51) Int. Cl.
| H04W 8/22 | (2009.01) |
| G08C 17/02 | (2006.01) |
| H04N 7/15 | (2006.01) |
| G06T 19/00 | (2011.01) |

(52) U.S. Cl.
CPC ............. *H04N 7/157* (2013.01); *G06T 19/006* (2013.01)

(58) Field of Classification Search
CPC .............................. H04N 7/157; G06T 19/006
USPC ................... 345/501, 419; 348/14.09, 14.07; 370/401, 362; 381/310; 455/417, 420; 705/7.14, 26.1, 27.2; 709/227; 715/757, 771, 706; 463/41
See application file for complete search history.

(56) References Cited

U.S. PATENT DOCUMENTS

| 5,764,639 | A * | 6/1998 | Staples | H04L 29/06 370/359 |
| 8,060,071 | B2 * | 11/2011 | Bertagnole | H04M 3/42238 370/259 |
| 8,520,872 | B2 * | 8/2013 | Jang | H04S 7/302 381/107 |
| 8,601,386 | B2 * | 12/2013 | Altberg | H04L 12/66 715/706 |
| 9,105,013 | B2 * | 8/2015 | Chavez | G06Q 10/101 |
| 9,251,504 | B2 * | 2/2016 | Chavez | G06Q 10/101 |

(Continued)

OTHER PUBLICATIONS

Wikipedia, "Head-mounted display", http://en.wikipedia.org/wiki/Head-mounted_display, Aug. 23, 2014, 9 pages.

(Continued)

*Primary Examiner* — Gerald Gauthier

(57) ABSTRACT

A device may provide information for a virtual reality environment to a virtual reality device. The virtual reality device may be operated by a first party. The device may determine that the first party of the virtual reality device is placing a call to a second party from within the virtual reality environment. The device may determine connection information associated with the first party and the second party. The device may cause the call to be established between the virtual reality device and a second party device associated with the second party via a telephone network using the connection information and without the second party device connecting to the virtual reality environment. The telephone network may be located external to the virtual reality environment. The second party device may connect to the telephone network without connecting to the virtual reality environment.

20 Claims, 14 Drawing Sheets

(56) References Cited

U.S. PATENT DOCUMENTS

| | | | | |
|---|---|---|---|---|
| 2003/0055984 A1* | 3/2003 | Shimakawa | A63F 13/12 | 709/227 |
| 2008/0252637 A1* | 10/2008 | Berndt | G06T 19/00 | 345/419 |
| 2008/0262910 A1* | 10/2008 | Altberg | G06Q 30/02 | 705/14.69 |
| 2008/0262911 A1* | 10/2008 | Altberg | G06Q 30/02 | 705/14.73 |
| 2008/0263446 A1* | 10/2008 | Altberg | G06Q 30/02 | 715/706 |
| 2008/0263459 A1* | 10/2008 | Altberg | G06Q 50/00 | 715/757 |
| 2008/0263460 A1* | 10/2008 | Altberg | G06Q 30/02 | 715/757 |
| 2014/0085316 A1* | 3/2014 | Narayanan | H04N 7/157 | 345/501 |
| 2014/0085406 A1* | 3/2014 | Narayanan | H04N 7/152 | 348/14.09 |
| 2014/0095235 A1* | 4/2014 | Phillips | G06Q 10/0631 | 705/7.14 |
| 2014/0245192 A1* | 8/2014 | Chavez | G06Q 10/00 | 715/757 |
| 2015/0201086 A1* | 7/2015 | Abi | H04M 7/006 | 370/352 |
| 2016/0037332 A1* | 2/2016 | Egeler | G08C 17/02 | 455/420 |

OTHER PUBLICATIONS

Wikipedia, "Oculus Rift", http://en.wikipedia.org/wiki/Oculus_Rift, Aug. 27, 2014, 11 pages.

* cited by examiner

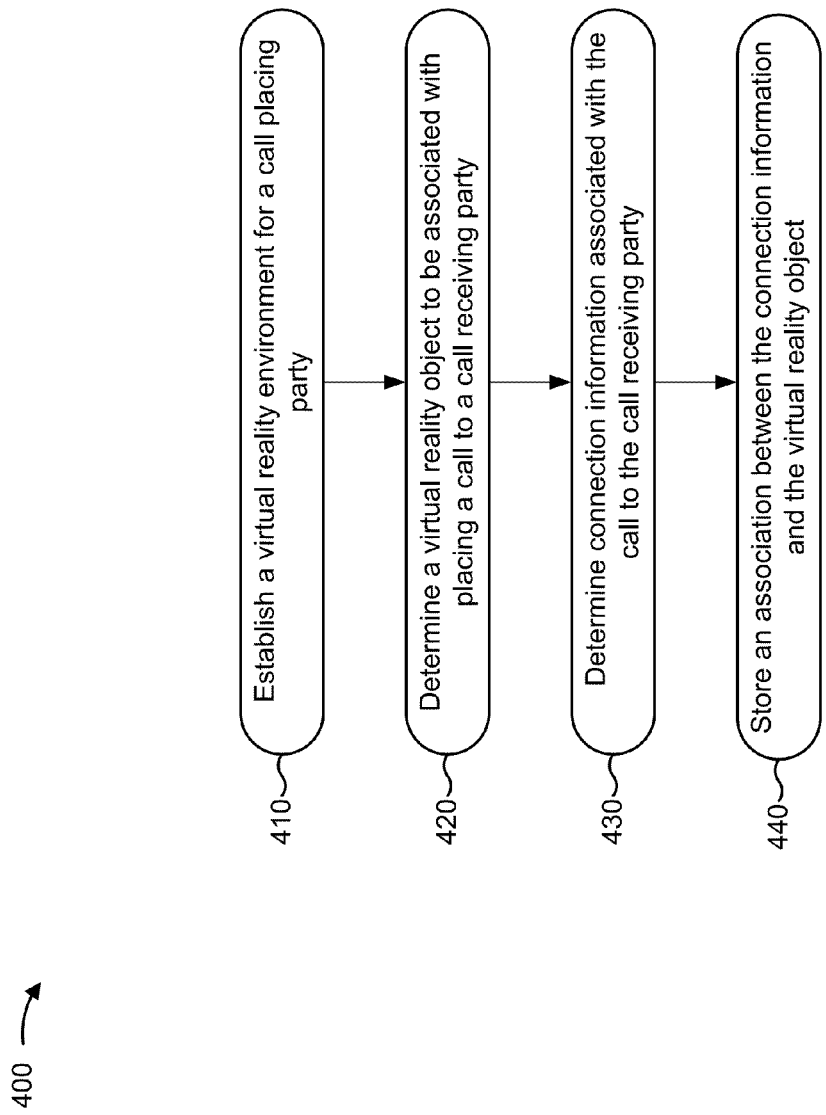

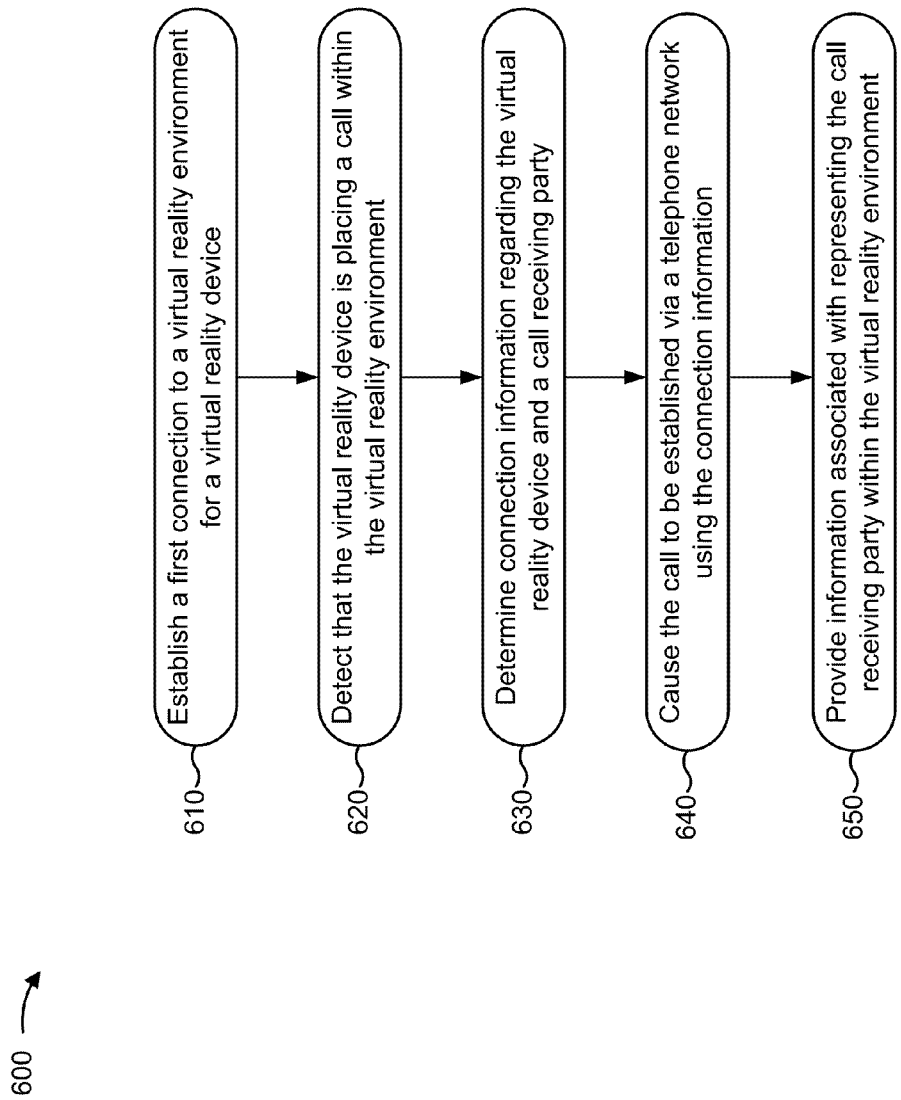

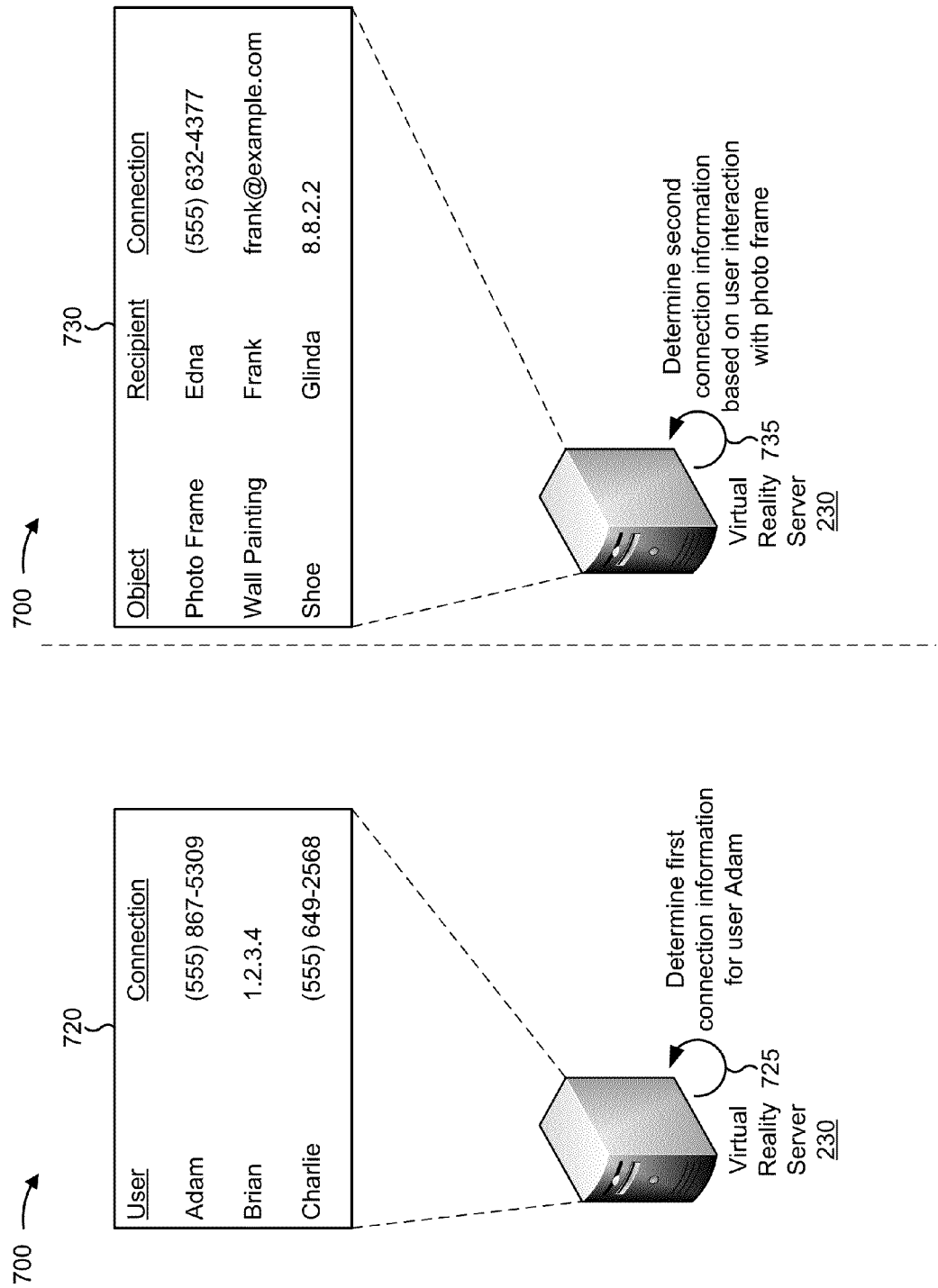

COMMUNICATION IN A VIRTUAL REALITY ENVIRONMENT

BACKGROUND

A virtual reality device may provide access to an interactive virtual reality environment. Multiple users may communicate via connections to the interactive virtual reality environment.

BRIEF DESCRIPTION OF THE DRAWINGS

FIG. 4 is a flow chart of an example process for configuring a virtual reality environment to associate a virtual reality object with placing a call to a call receiving party;

FIG. 6 is a flow chart of an example process for placing a call within a virtual reality environment and connecting the call via a telephone network; and FIGS. 7A-7E are diagrams of an example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

A user of a virtual reality device may connect to a virtual reality environment hosted by a virtual reality server. The user may interact with one or more virtual reality objects in the virtual reality environment, and may communicate with one or more other users that are accessing the virtual reality environment. A connection to the virtual reality environment may be resource intensive, and may require that the connection facilitate transfer of audio, streaming video, text, or the like. However, a call recipient may not be capable of connecting to the virtual reality environment, and resource allocation for a connection to the virtual reality environment may be unnecessarily resource intensive. Implementations, described herein, may assist a virtual reality server in receiving a request to establish a call from a user utilizing a virtual reality environment associated with a virtual reality server, and causing the call to be connected via a telephone network external to the virtual reality environment. In this way, the call may be connected for a call placing party and a call receiving party without a data-intensive connection to the virtual reality environment being established for the call receiving party. Furthermore, implementations, described herein, may utilize a virtual reality object to represent a call for a user of a virtual reality environment.

Figure 1A:
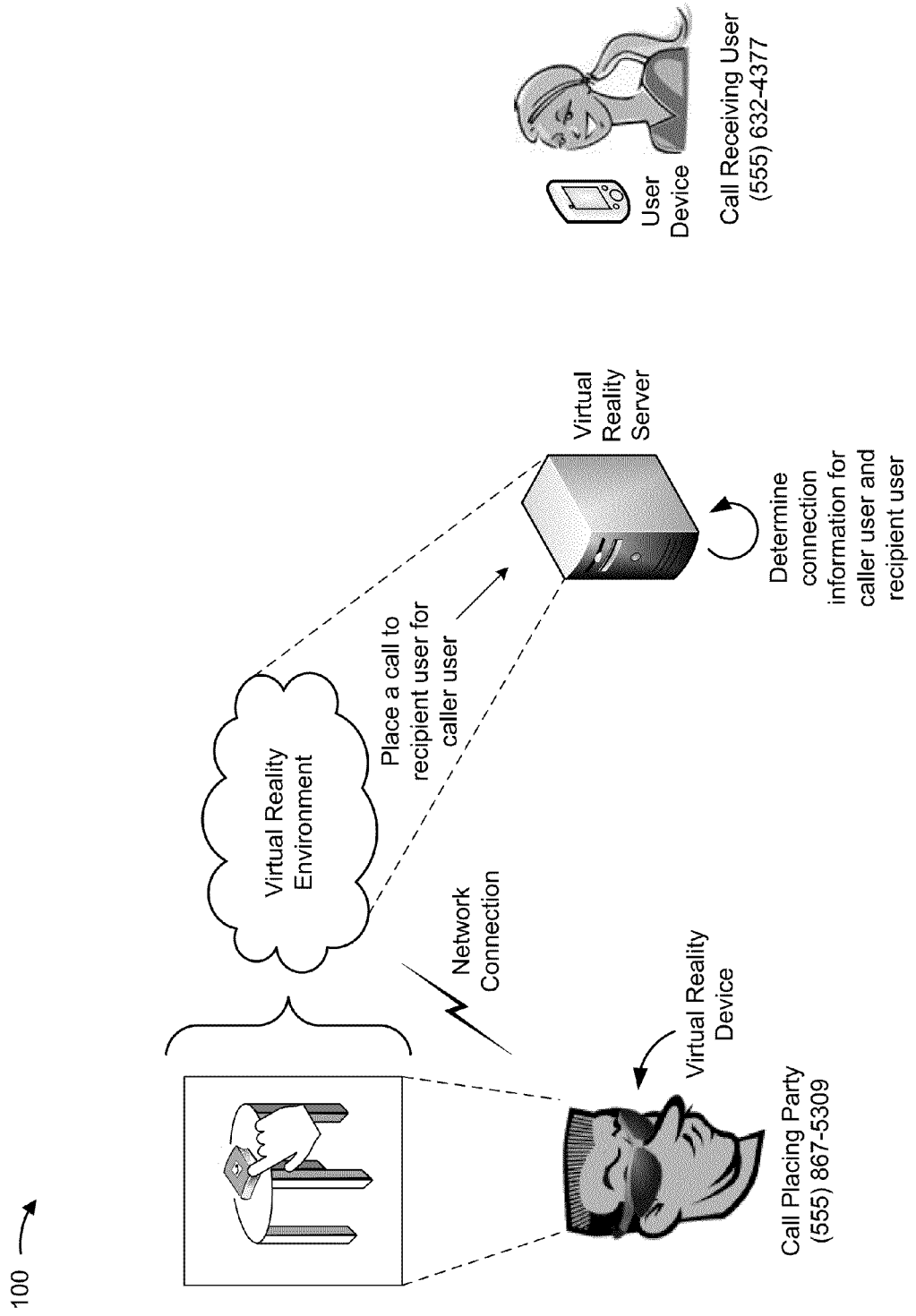
FIGS. 1A and 1B are diagrams of an overview of an example implementation described herein.
Figure 1B:
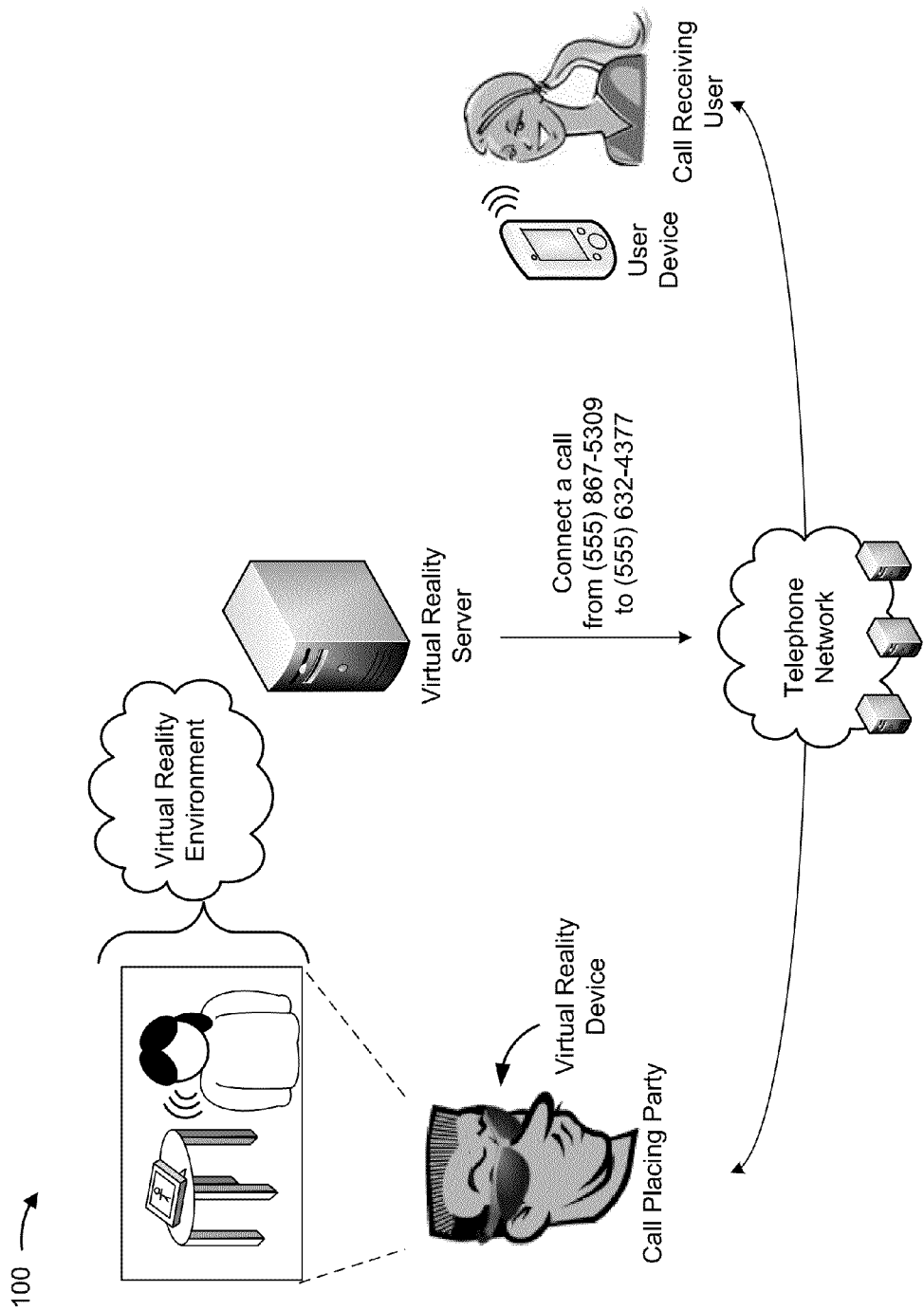

FIGS. 1A and 1B are diagrams of an overview of an example implementation 100 described herein. As shown in FIG. 1A, assume that a call placing party is using a virtual reality device to connect via a network connection to a virtual reality environment. Further assume that a virtual reality object (e.g., a photo frame) has been associated with placing a call to a call receiving party upon an interaction therewith by the call placing party. In another example, the call placing party may interact with another virtual reality object (e.g., a phone permitting a call to a specified user, a heart object associated with a call to a spouse, a toy object associated with a call to a child, a map object associated with a call to a relative at a location indicated by the map object, or the like). In another example, the call placing party interacts in a specified way (e.g., picking up an object, turning an object, etc.). Based on a user interaction with the virtual reality object, the virtual reality server determines that a call is to be placed from the call placing party to the call receiving party. The virtual reality server may determine connection information associated with the call placing party and the call receiving party. For example, the virtual reality server may determine a first phone number associated with the call placing party, and may determine a second phone number for a user device associated with the call receiving party.

As shown in FIG. 1B, the virtual reality server may cause a telephone network (e.g., one or more telephone network control devices associated with operating the telephone network) to connect the call. For example, the virtual reality server may provide the first phone number and the second phone number, thereby causing the call to be connected by the one or more telephone network control devices (e.g., one or more devices that may include a server, a switch, a hub, a router, a gateway, etc.). In some implementations, the virtual reality server may provide the first phone number and the second phone number via a network connection between the virtual reality server and the telephone network control devices. The virtual reality server may adjust the virtual reality environment to provide a representation of the call receiving party (e.g., an avatar, a video, an interactive three-dimensional representation, or the like). By causing the call to be connected via the telephone network, the virtual reality server may leverage existing network architecture to facilitate communications with call receiving parties that are unable and/or unwilling to connect to the virtual reality environment. Furthermore, the virtual reality server may avoid excessive network load on the virtual reality environment caused by excess quantities of users connecting to the virtual reality environment to communicate.

Figure 2A:
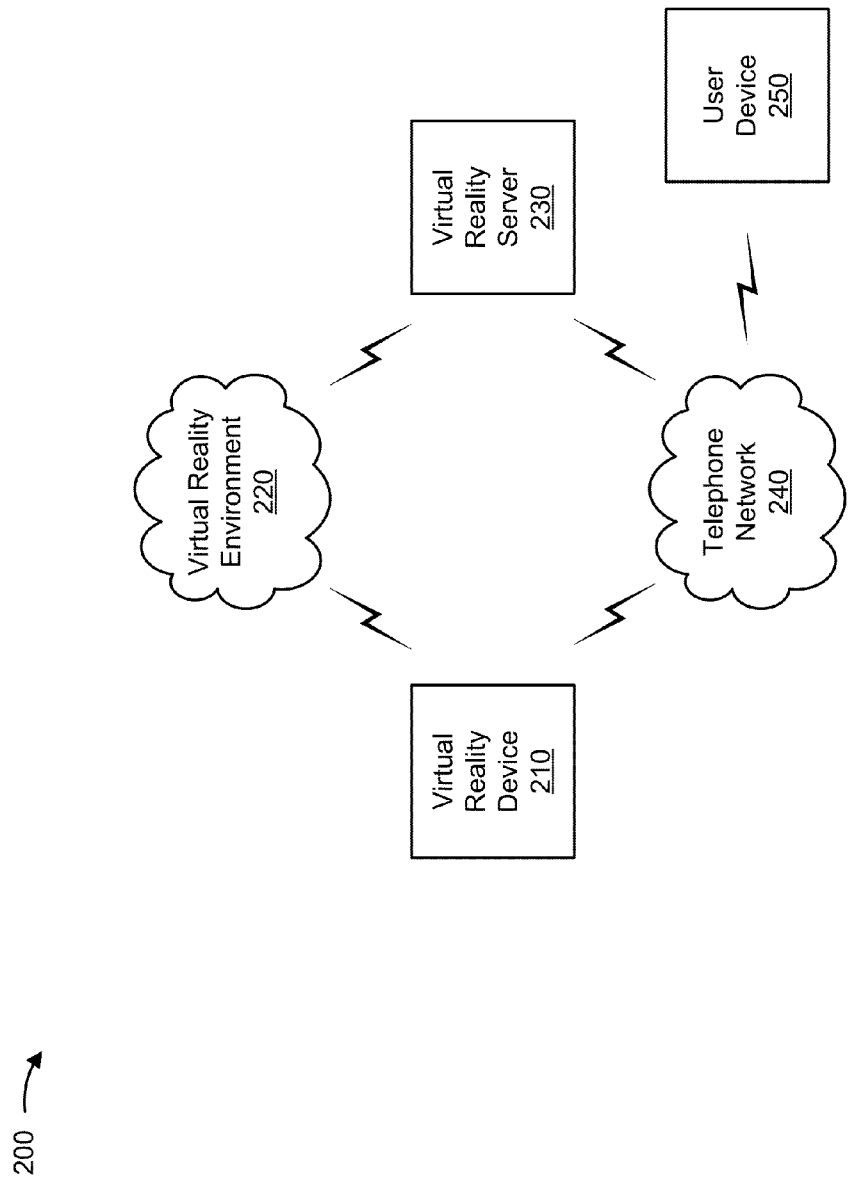
FIGS. 2A and 2B are diagrams of an example environment in which systems and/or methods, described herein, may be implemented.
Figure 2B:
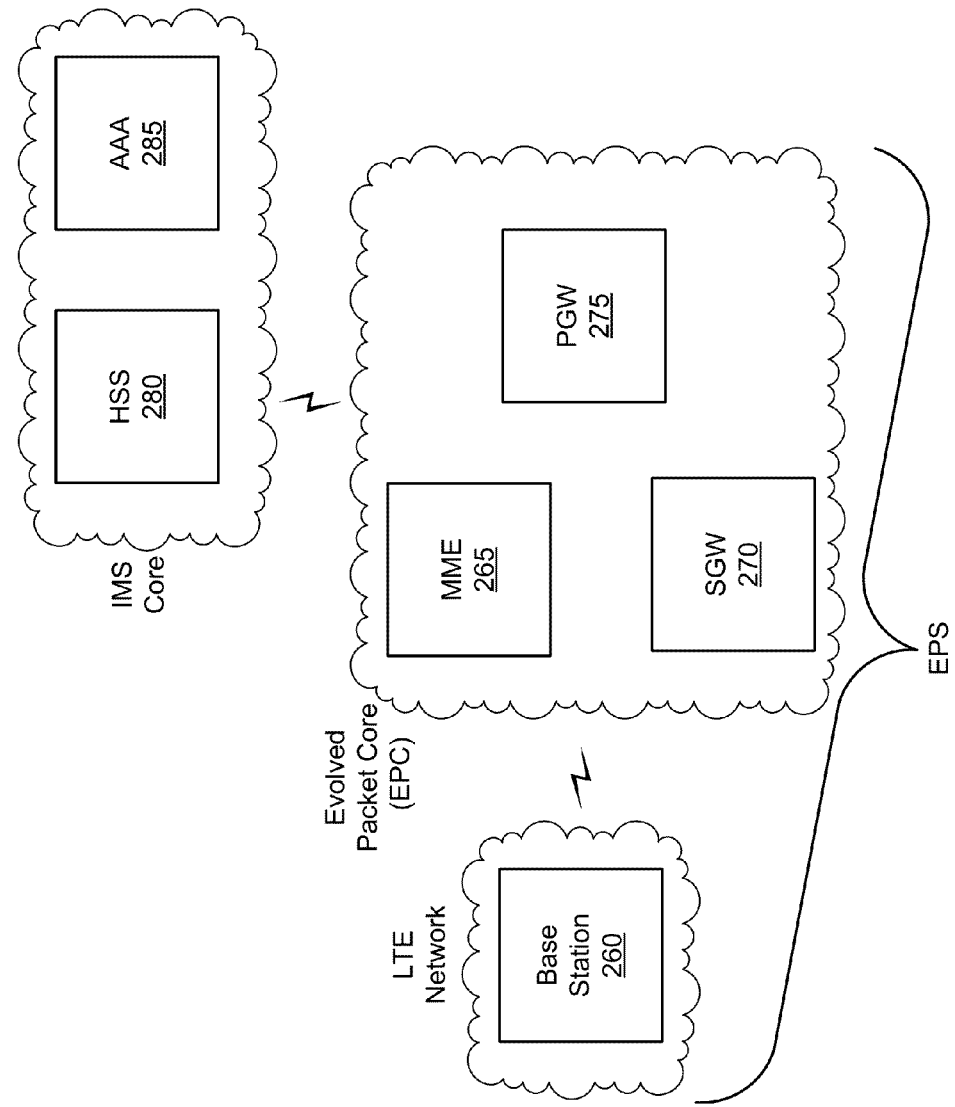

FIGS. 2A and 2B are diagrams of an example environment 200 in which systems and/or methods, described herein, may be implemented. As shown in FIG. 2A, environment 200 may include a virtual reality device 210, a virtual reality environment 220, a virtual reality server 230, a telephone network 240, and a user device 250. Devices of environment 200 may interconnect via wired connections, wireless connections, or a combination of wired and wireless connections.

Virtual reality device 210 may include a device capable of receiving, generating, storing, processing, and/or providing a virtual reality environment. For example, virtual reality device 210 may include a head-mounted display, an optical head-mounted display, a helmet-mounted display, an augmented reality display, an Oculus Rift®, or the like. In some implementations, virtual reality device 210 may connect to virtual reality environment 220 and/or telephone network 240 (e.g., directly via a communication interface integrated into virtual reality device 210, or indirectly via a Bluetooth connection, a near field communication (NFC) connection, a wireless local area network (WLAN) connection, or the like with a communication device, such as a smart phone, a modem, a router, a computer, or the like). In some implementations, virtual reality device 210 may facilitate interaction with virtual reality environment 220, such as via one or more input peripherals.

Virtual reality environment 220 may include one or more server devices associated with providing a virtual reality environment. For example, virtual reality environment 220 may include a cloud computing network, a cloud server, a cloud data structure, or the like. In some implementations, virtual reality environment 220 may be operated by virtual reality server 230. In some implementations, virtual reality server 230 may monitor virtual reality environment 220 to detect a user interaction therewith, and may adjust virtual reality environment 220 based on the user interaction.

Virtual reality server 230 may include one or more devices capable of storing, processing, and/or routing information associated with virtual reality environment 220. For example, virtual reality server 230 may include a server associated with a particular virtual reality environment provider. In some implementations, virtual reality server 230 may configure virtual reality environment 220, such as by providing user authentication information, user identification information, information associated with generating an avatar of a particular user, information associated with providing a particular environment, or the like. In some implementations, virtual reality server 230 may provide information associated with causing a connection to be established between virtual reality device 210 and user device 250 via telephone network 240.

Telephone network 240 may include one or more wired and/or wireless networks and/or one or more devices associated with the one or more wired and/or wireless networks. For example, telephone network 240 may include a cellular network (e.g., a long term evolution (LTE) network, a third generation (3G) network, a code division multiple access (CDMA) network, etc.), a telephone network (e.g., the Public Switched Telephone Network (PSTN)), and/or a combination of these or another type of network. In some implementations, telephone network 240 may include one or more telephone network control devices, such as one or more switches, gateways, base stations, telephone exchanges, servers, and/or one or more devices described herein with respect to FIG. 2B, or the like. In some implementations, telephone network 240 may establish a connection between virtual reality device 210 and user device 250, or virtual reality server 230 and user device 250, separate from any connections to virtual reality environment 220.

User device 250 may include a device capable of receiving, generating, storing, processing, and/or providing information associated with a communication. For example, user device 250 may include a communications and/or computing device, such as a mobile phone (e.g., a smart phone, a radiotelephone, etc.), a desktop computer, a laptop computer, a tablet computer, a handheld computer, a gaming device, virtual reality device 210, or a similar device. In some implementations, user device 250 may communicate with virtual reality device 210 via a connection established via telephone network 240 (e.g., a telephone call). In some implementations, user device 250 may receive information from and/or transmit information to another device in environment 200.

FIG. 2B is a diagram of an example of telephone network 240. As shown in FIG. 2B, telephone network 240 may include a base station 260; a mobility management entity device (MME) 265; a serving gateway (SGW) 270; a packet data network gateway (PGW) 275; a home subscriber server (HSS) 280; an authentication, authorization, and accounting server (AAA) 285. Devices of environment 200 may interconnect via wired connections, wireless connections, or a combination of wired and wireless connections.

Some implementations are described herein with respect to FIG. 2B as being performed within a long term evolution (LTE) network for explanatory purposes. Some implementations may be performed within a network that is not an LTE network, such as a third generation (3G) network.

Telephone network 240 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which virtual reality device 210 and/or user device 250 communicates with the EPC. The EPC may include MME 265, SGW 270, and/or PGW 275 that enable virtual reality device 210 and/or user device 250 to communicate with another network and/or an Internet protocol (IP) multimedia subsystem (IMS) core. The IMS core may include HSS 280 and/or AAA 285, and may manage device registration and authentication, session initiation, etc., associated with virtual reality device 210 and/or user device 250. HSS 280 and/or AAA 285 may reside in the EPC and/or the IMS core.

Base station 260 may include one or more devices capable of transferring traffic, such as audio, video, text, and/or other traffic, destined for and/or received from virtual reality device 210 and/or user device 250.

MME 265 may include one or more devices, such as one or more server devices, capable of managing authentication, activation, deactivation, and/or mobility functions associated with virtual reality device 210 and/or user device 250.

SGW 270 may include one or more devices capable of routing packets. For example, SGW 270 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic.

PGW 275 may include one or more devices capable of providing connectivity for virtual reality device 210 and/or user device 250 to external packet data networks (e.g., other than the depicted EPC and/or LTE network). For example, PGW 275 may include one or more data processing and/or traffic transfer devices, such as a gateway, a router, a modem, a switch, a firewall, a NIC, a hub, a bridge, a server device, an OADM, or any other type of device that processes and/or transfers traffic.

HSS 280 may include one or more devices, such as one or more server devices, capable of managing (e.g., receiving, generating, storing, processing, and/or providing) information associated with virtual reality device 210 and/or user device 250. For example, HSS 280 may manage subscription information associated with virtual reality device 210 and/or user device 250, or the like.

AAA 285 may include one or more devices, such as one or more server devices, that perform authentication, authorization, and/or accounting operations for communication sessions associated with virtual reality device 210 and/or user device 250. For example, AAA 285 may perform authentication operations for virtual reality device 210 and/or user device 250 and/or a user of virtual reality device 210 and/or user device 250 (e.g., using one or more credentials), may control access, by virtual reality device 210 and/or user device 250, to a service and/or an application (e.g., based on one or more restrictions, such as time-of-day restrictions, location restrictions, single or multiple access restrictions, read/write restrictions, etc.), may track resources consumed by virtual reality device 210 and/or user device 250 (e.g., a quantity of voice minutes consumed, a quantity of data consumed, etc.), and/or may perform similar operations.

The number and arrangement of devices and networks shown in FIGS. 2A and 2B are provided as an example. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
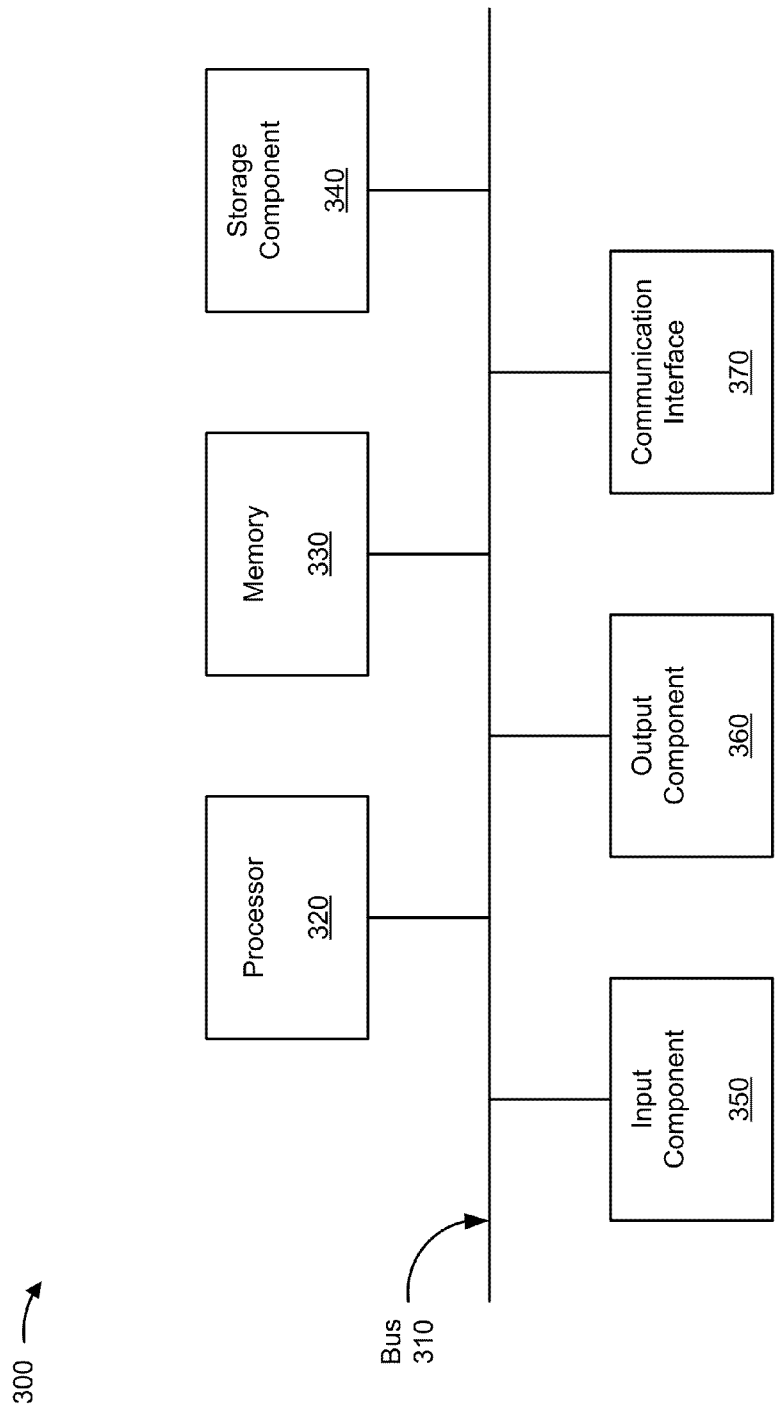
FIG. 3 is a diagram of example components of one or more devices of FIGS. 2A and 2B.

FIG. 3 is a diagram of example components of a device 300. Device 300 may correspond to virtual reality device 210, virtual reality server 230, user device 250, and/or a device of telephone network 240. In some implementations, virtual reality device 210, virtual reality server 230, user device 250, and/or a device of telephone network 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring a virtual reality environment to associate a virtual reality object with placing a call to a call receiving party. In some implementations, one or more process blocks of FIG. 4 may be performed by virtual reality server 230. Additionally, or alternatively, one or more process blocks of FIG. 4 may be performed by another device or a group of devices separate from or including virtual reality server 230, such as virtual reality device 210, user device 250, and/or one or more other devices associated with virtual reality environment 220 and/or telephone network 240.

As shown in FIG. 4, process 400 may include establishing a virtual reality environment for a call placing party (block 410). For example, virtual reality server 230 may establish virtual reality environment 220 for the call placing party to access via virtual reality device 210. Virtual reality environment 220 may include an interactive, immersive video that may be viewed and/or interacted with by a particular user of virtual reality device 210.

In some implementations, virtual reality server 230 may establish virtual reality environment 220 based on a request from virtual reality device 210. For example, a particular call placing party of virtual reality device 210 may request that virtual reality server 230 establish virtual reality environment 220. A call placing party may refer to a particular user of virtual reality device 210 who will place a call, within virtual reality environment 220, which is to be connected via telephone network 240 to a call receiving party as explained herein in connection with FIG. 6. A call receiving party may refer to a particular user of user device 250 that is to receive the call via telephone network 240 from the call placing party.

In some implementations, virtual reality server 230 may establish a different virtual reality environment 220 from a virtual reality environment 220 that the call placing party is utilizing. For example, the call placing party may utilize a first virtual reality environment 220 to view a concert, and may indicate that a second virtual reality environment 220 that includes a set of virtual reality objects for association with placing a call is to be provided.

In some implementations, virtual reality server 230 may establish virtual reality environment 220 based on determining that virtual reality device 210 is active. For example, when the call placing party turns on virtual reality device 210, virtual reality server 230 may establish virtual reality environment 220, and may provide virtual reality device 210 with access to virtual reality environment 220.

In some implementations, virtual reality server 230 may provide, to virtual reality device 210, information associated with virtual reality environment 220 when establishing virtual reality environment 220 for the call placing party. For example, virtual reality server 230 may provide an internet protocol (IP) address, a network port identifier, or the like, to virtual reality device 210, and virtual reality device 210 may connect to virtual reality environment 220 using the IP address, network port identifier, or the like.

In some implementations, virtual reality server 230 may determine user information associated with the call placing party when establishing virtual reality environment 220. For example, virtual reality server 230 may access information associated with generating an avatar (e.g., a digital representation, a three-dimensional computer-generated representation, etc.) of the call placing party, and may provide, to virtual reality environment 220, the information associated with generating the avatar. Additionally, or alternatively, virtual reality server 230 may receive user information from virtual reality device 210. For example, virtual reality device 210 may provide information associated with generating the avatar, such as an image, a set of physical characteristics associated with the call placing party, or the like. Additionally, or alternatively, virtual reality server 230 may determine identification information associated with the call placing party. For example, virtual reality server 230 may determine a name, a username, a phone number, an internet protocol (IP) address, a media access control (MAC) address, or the like.

As further shown in FIG. 4, process 400 may include determining a virtual reality object to be associated with a placing a call to a call receiving party (block 420). For example, virtual reality server 230 may identify the virtual reality object to be associated with the connection to the call receiving party. A virtual reality object may refer to a digital representation of an object within virtual reality environment 220, such as a virtual telephone, a virtual book, a virtual photograph, a virtual picture, a virtual bookcase, a virtual shoe, or any other object that can be represented in a virtual reality environment. In some implementations, virtual reality server 230 may permit a single virtual reality object to be associated with multiple call receiving parties. For example, virtual reality server 230 may permit a virtual book to be associated with a set of call receiving parties.

In some implementations, virtual reality server 230 may receive a selection of the virtual reality object from the call placing party (e.g., via virtual reality device 210). For example, virtual reality server 230 may monitor virtual reality environment 220 to detect a user interaction, and may detect that the user interaction is a selection of a particular virtual reality object to be associated with a call (e.g., a call to a call receiving party). Additionally, or alternatively, virtual reality server 230 may provide information identifying a set of virtual reality objects to the call placing party, and may receive an indication of a selection of one or more of these virtual reality objects via virtual reality device 210.

In some implementations, virtual reality device 230 may receive a selection of a particular virtual reality object to be associated with multiple call receiving parties (e.g., a conference call). Additionally, or alternatively, virtual reality device 230 may receive information associated with configuring the selection, such as information indicating that the particular virtual reality object is to be selected based on a virtual reality interaction with a virtual reality left hand, a virtual reality interaction with a virtual reality right hand, a particular virtual reality gesture, or the like). For example, virtual reality device 230 may receive information, from the call placing party, indicating that a first gesture indicates a call to a particular call receiving party, and a second gesture indicates a call to the particular call receiving party and a set of other call receiving parties (e.g., a conference call).

As further shown in FIG. 4, process 400 may include determining connection information associated with the call to the call receiving party (block 430). For example, virtual reality server 230 may determine connection information, such as a user name, a user identifier, a phone number associated with user device 250, an IP address associated with user device 250, an email address, or the like, that may be utilized to establish the call without the call receiving party connecting to virtual reality environment 220, as described herein in connection with FIG. 6. In some implementations, virtual reality server 230 may determine the connection information based on querying the call placing party. For example, when the call placing party selects the virtual reality object to be associated with the connection to the call receiving party, virtual reality server 230 may request connection information for the call receiving party. Additionally, or alternatively, virtual reality server 230 may determine the connection information based on accessing one or more data structures. For example, virtual reality server 230 may access a data structure storing contact information associated with an address book for the call placing party, a data structure storing information associated with identifying network subscribers, or the like.

As further shown in FIG. 4, process 400 may include storing an association between the connection information and the virtual reality object (block 440). For example, virtual reality server 230 may store information identifying the association between the connection information and the virtual reality object via a data structure (e.g., a repository, a database, a list, or the like associated with virtual reality server 230). In some implementations, virtual reality server 230 may provide the information identifying the association to virtual reality device 210, virtual reality environment 220, or the like, for storage.

In some implementations, virtual reality server 230 may provide an indication that the association has been stored. For example, virtual reality server 230 may adjust virtual reality environment 220 to indicate that the virtual reality object is associated with the connection information for the call receiving party (e.g., by altering the virtual reality object to include an image of the call receiving party, by highlighting the virtual reality object, or the like, by altering virtual reality environment 220, such as by changing virtual reality environment 220 to a conference room, a cityscape, a beach, or the like).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
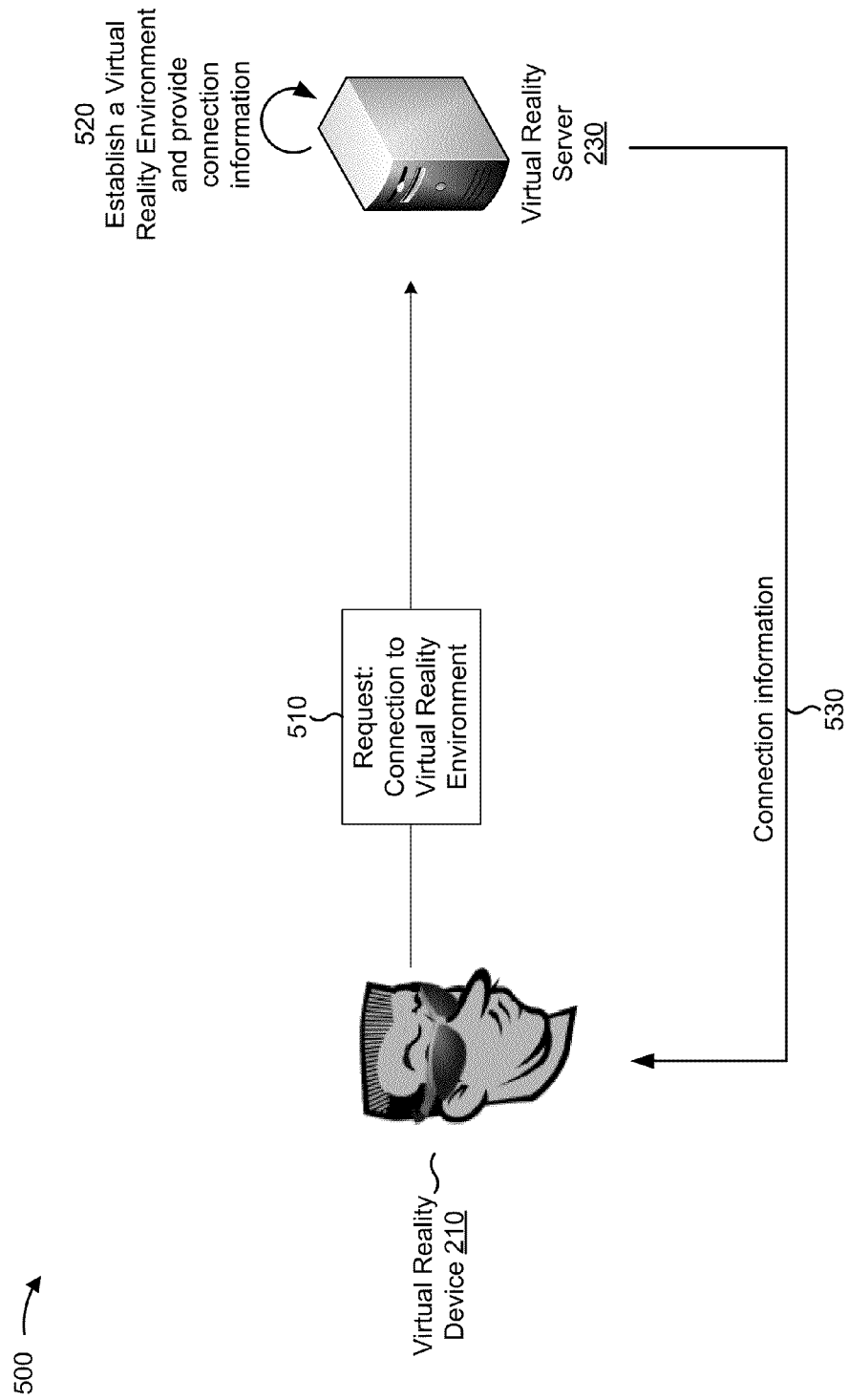
FIGS. 5A-5C are diagrams of an example implementation relating to the example process shown in FIG. 4.
Figure 5B:
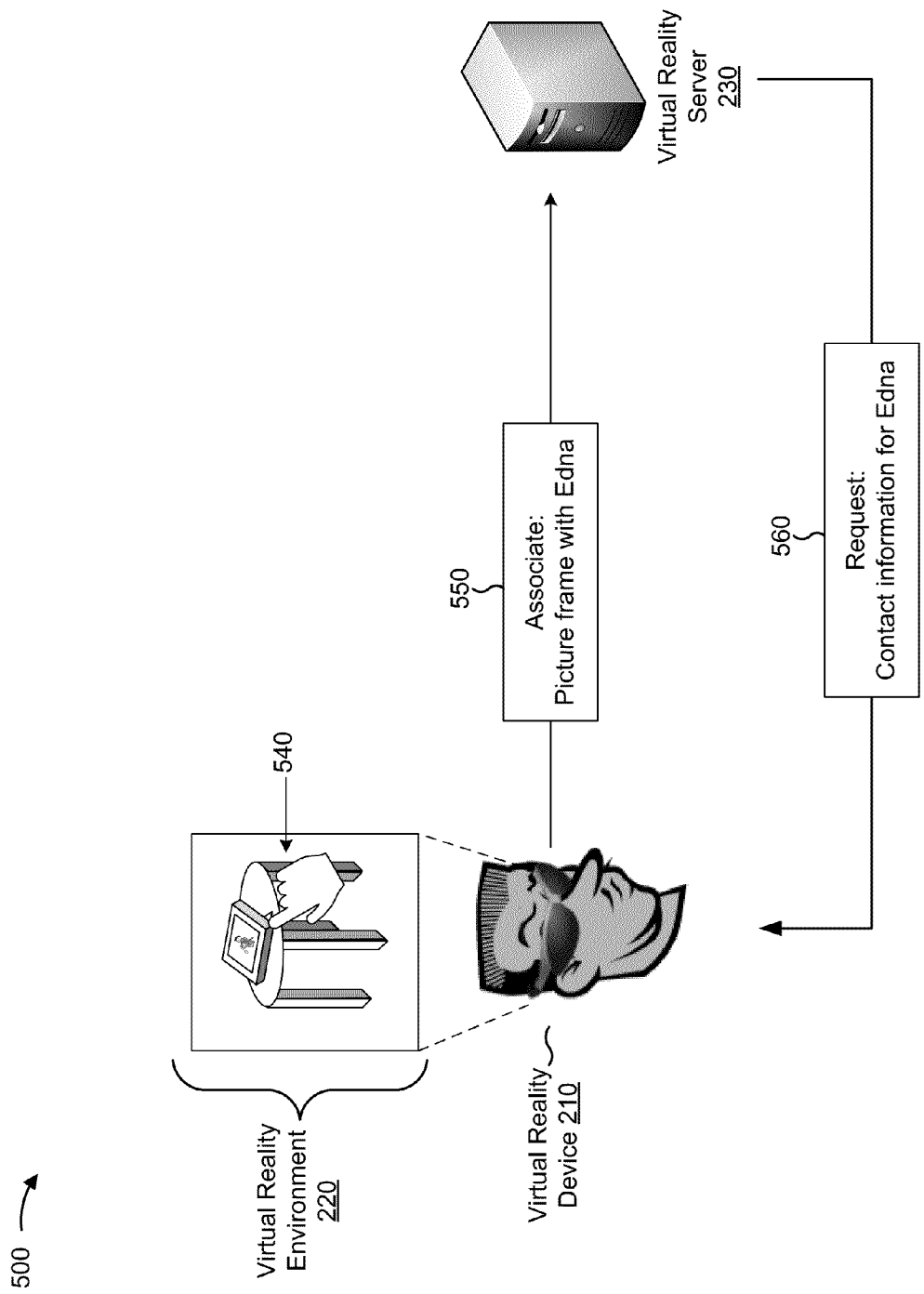
Figure 5C:
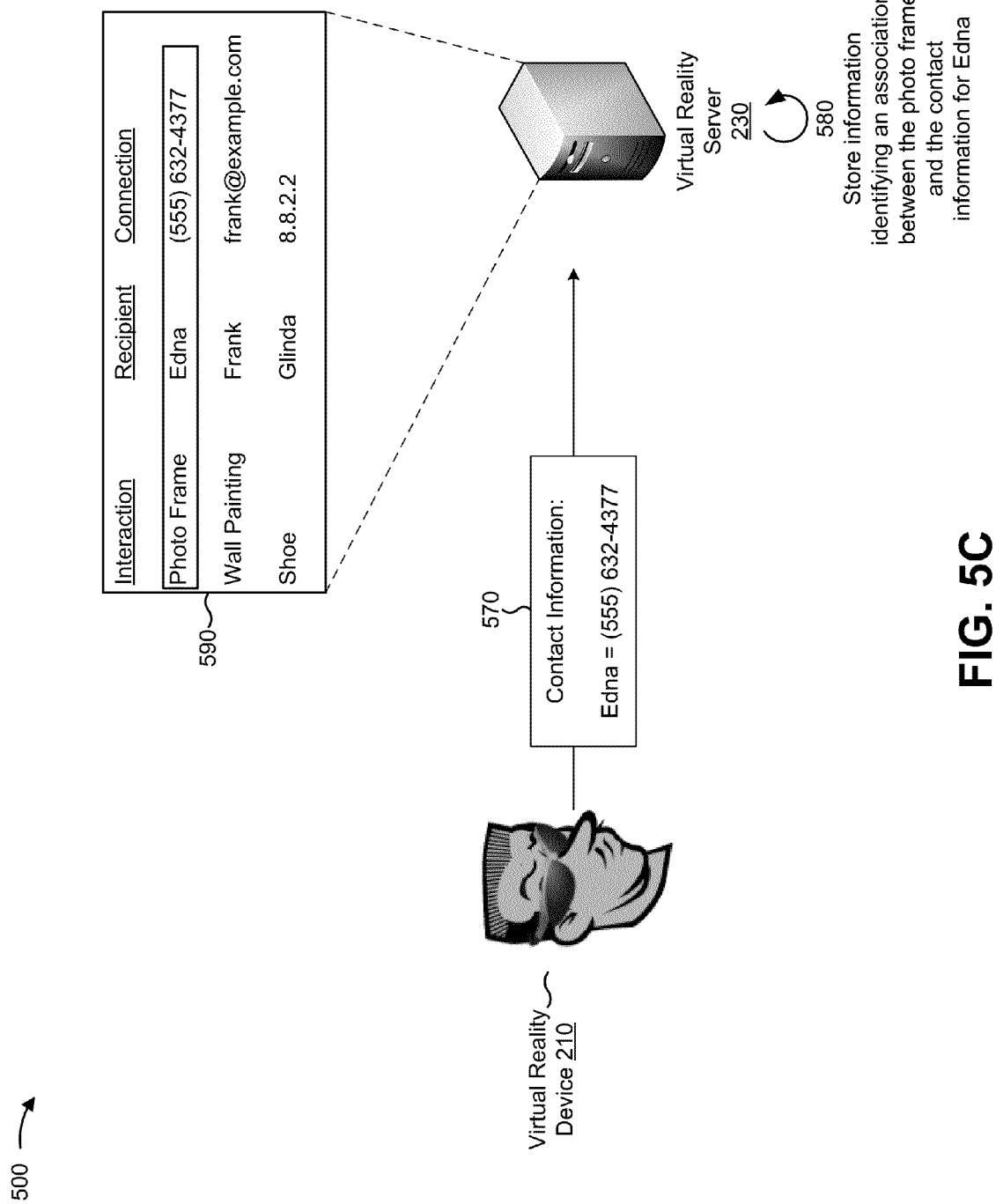

FIGS. 5A-5C are diagrams of an example implementation 500 relating to example process 400 shown in FIG. 4. FIGS. 5A-5C show an example of configuring a virtual reality environment to associate a virtual reality object with a placing a call to a call receiving party.

As shown in FIG. 5A, assume a user (e.g., a call placing party) of virtual reality device 210 activates virtual reality device 210. As shown by reference number 510, virtual reality device 210 provides a request for a connection to virtual reality environment 220. As shown by reference number 520, virtual reality server 230 establishes virtual reality environment 220 and provides connection information to virtual reality device 210. As shown by reference number 530, virtual reality device 210 receives the connection information from virtual reality server 230.

As shown in FIG. 5B, and by reference number 540, based on a user interaction via a user interface with a virtual reality object (e.g., a framed photograph) being displayed within virtual reality environment 220, virtual reality device 210 requests (e.g., based on the user providing an indication that the user interaction is intended as a request, based on recognition of the user interaction as being associated with a request, or the like) that virtual reality server 230 associate the virtual reality object (e.g., an object that has been created based on a request by the user for an object that may be associated with a call, an object that was created based on stored information regarding virtual reality environment 220, or the like) with a call receiving party (e.g., "Edna"). As shown by reference number 550, the request is received by virtual reality server 230. As shown by reference number 560, virtual reality server 230 requests that virtual reality device 210 provide contact information for the call receiving party.

As shown in FIG. 5C, and by reference number 570, virtual reality device 210 provides particular contact information (e.g., that may be specified by virtual reality server 230, that may be based on information suggesting contact information that is to be provided to create an association with a call receiving party, or the like) associated with the call receiving party, Edna, to virtual reality server 230. As shown by reference number 580, virtual reality server 230 accesses a data structure to store information identifying the association between the virtual reality object and the particular contact information. As shown by reference number 590, the data structure includes information identifying the virtual reality object that may be subject to a user interaction (e.g., the "Photo Frame"), the call receiving party (e.g., "Edna"), and the particular connection information for the call receiving party (e.g., "(555) 632-4377"). In this way, virtual reality server 230 may represent a call to a call receiving party as a virtual reality object within a virtual reality environment 220.

As indicated above, FIGS. 5A-5C are provided merely as an example. Other examples are possible and may differ from what was described with regard to FIGS. 5A-5C.

FIG. 6 is a flow chart of an example process 600 for placing a call within a virtual reality environment and connecting the call via a telephone network. In some implementations, one or more process blocks of FIG. 6 may be performed by virtual reality server 230. Additionally or alternatively, one or more process blocks of FIG. 6 may be performed by another device or a group of devices separate from or including virtual reality server 230, such as virtual reality device 210, user device 250, and/or one or more other devices associated with virtual reality environment 220 and/or telephone network 240.

As shown in FIG. 6, process 600 may include establishing a first connection to a virtual reality environment for a virtual reality device (block 610). For example, virtual reality server 230 may establish the first connection to virtual reality environment 220 for virtual reality device 210. In some implementations, virtual reality server 230 may establish the first connection based on a request for a connection from virtual reality device 210. For example, virtual reality device 210 may request access to virtual reality environment 220, and virtual reality server 230 may provide an IP address for virtual reality device 210 to utilize to connect to virtual reality environment 220. Additionally, or alternatively, virtual reality server 230 may establish the first connection based on detecting that virtual reality device 210 is active as described herein in connection with FIG. 4.

As further shown in FIG. 6, process 600 may include detecting that the virtual reality device is placing a call within the virtual reality environment (block 620). For example, virtual reality server 230 may detect that virtual reality device 210 is placing the call within virtual reality environment 220. In some implementations, virtual reality server 230 may detect the call based on receiving an indication of the particular call from virtual reality device 210. For example, when a call placing party intends to place a call from within virtual reality environment 220, virtual reality device 210 may provide information identifying the call to virtual reality server 230. Additionally, or alternatively, virtual reality server 230 may detect the particular call based on monitoring virtual reality environment 220. For example, based on monitoring virtual reality environment 220, virtual reality server 230 may determine that a call placing party utilizing virtual reality device 210 is interacting with a virtual reality object (e.g., that is associated with placing a call to a particular call receiving party, as described herein in connection with FIG. 4), such as a virtual phone, a virtual address book, a virtual picture, or any other object within virtual reality environment 220, that has been previously associated with placing a call. In this case, virtual reality server 230 may access stored information identifying virtual reality objects that are associated with placing particular calls.

As further shown in FIG. 6, process 600 may include determining connection information regarding the virtual reality device and a call receiving party (block 630). For example, virtual reality server 230 may determine connection information regarding virtual reality device 210 and the call receiving party. In some implementations, virtual reality server 230 may query virtual reality device 210 to determine connection information for the call placing party. For example, virtual reality server 230 may request that virtual reality device 210 provide connection information (e.g., a user name, a phone number, an IP address, a MAC address, or the like). Additionally, or alternatively, virtual reality server 230 may access stored connection information. For example, virtual reality server 230 may access connection information associated with the call placing party that had been stored before or when the first connection was established.

Virtual reality server 230 may access stored information regarding the call receiving party to determine the connection information, in some implementations. For example, virtual reality server 230 may access a data structure storing information identifying an association between a virtual reality object (e.g., a particular virtual reality object with which the call placing party interacted within virtual reality environment 220) and the call receiving party. In this case, virtual reality server 230 may access connection information associated with the call receiving party stored via the data structure, such as a user name, a phone number, or the like. Additionally, or alternatively, virtual reality server 230 may query the call placing party for connection information associated with the call receiving party. For example, virtual reality server 230 may request that the call placing party provide a phone number for the call receiving party, and may receive the phone number from the call placing party (e.g., via virtual reality device 210).

As further shown in FIG. 6, process 600 may include causing the call to be established via a telephone network using the connection information (block 640). For example, virtual reality server 230 may cause the call to be established between virtual reality device 210 and user device 250 via telephone network 240 (e.g., a second connection). A call may refer to a communication between virtual reality device 210 and user device 250 that may include audio, video, text, or the like, and is connected via telephone network 240, and without user device 250 connecting via virtual reality environment 220. In other words, user device 250 operates and receives the call external to virtual reality environment 220.

Virtual reality server 230 may cause the call to be established by requesting that one or more devices associated with telephone network 240 establish the call, in some implementations. For example, virtual reality server 230 may provide the connection information to the one or more devices associated with telephone network 240 (e.g., a packet gateway, a serving gateway, a base station, etc.). In this case, the call may be established between virtual reality device 210 and user device 250 via telephone network 240 by the one or more devices associated with telephone network 240. In this way, a call placing party of virtual reality device 210 may connect to a call receiving party of user device 250 using existing network architecture, routing procedures, quality controls, and traffic shaping. Furthermore, user device 250 need not connect to virtual reality environment 220 for the call to be connected.

In some implementations, virtual reality server 230 may cause a view of virtual reality environment 220 to be provided when causing the call to be established. For example, virtual reality server 230 may cause a video-call to be established, and may configure the video-call to provide the call placing party's view of virtual reality environment 220 for display via user device 250. In some implementations, virtual reality server 230 may cause media to be shared when causing the call to be established. For example, virtual reality server 230 may cause a data-stream to be established, and the call placing party and/or the call receiving party may share media via the data stream, that may be displayed by virtual reality device 210 and/or user device 250.

In some implementations, virtual reality server 230 may connect user device 250 to virtual reality environment 220 after causing the call to be established. For example, the call placing party may connect to the call receiving party via telephone network 240, and may determine that the call receiving party wants to join the call placing party in virtual reality environment 220 (e.g., based on the call receiving party telling the call placing party of an intent to join virtual reality environment 220, based on a message being transmitted from the call receiving party to the call placing party, or the like). In this case, virtual reality server 230 may establish another connection to provide user device 250 with access to virtual reality environment 220. Additionally, or alternatively, virtual reality server 230 may modify virtual reality environment 220 based on one or more preferences of the call placing party and/or the call receiving party. For example, when the call placing party is viewing a mountain landscape within virtual reality environment 220, virtual reality server 230 may adjust virtual reality environment 220 to display a conference room when virtual reality device 210 is connected with user device 250 via telephone network 240 based on a preference of the call placing party.

As further shown in FIG. 6, process 600 may include providing information associated with representing the call receiving party within the virtual reality environment (block 650). For example, virtual reality server 230 may provide information (e.g., that is based on stored information, user configured information, user specified information, default information, or the like) associated with representing the call receiving party within virtual reality environment 220. In some implementations, virtual reality server 230 may provide information associated with generating an avatar within virtual reality environment 220. For example, virtual reality server 230 may provide one or more attributes associated with the call receiving party (e.g., a height, a weight, a skin color, an eye color, etc.) for generating the avatar. Additionally, or alternatively, virtual reality server 230 may configure virtual reality environment 220 to represent the call receiving party, such as by displaying an image of the call receiving party, generating a virtual reality object (e.g., a speaker-box) through which to provide the call receiving party's voice, displaying a live-video of the call receiving party, identifying a pre-configured virtual reality avatar of the call receiving party, or the like. For example, virtual reality server 230 may determine that the call includes a video-call data stream, and may configure virtual reality environment 220 so that virtual reality device 210 may overlay the video-call data stream on a virtual reality object within virtual reality environment 220 (e.g., the video-call data stream may be displayed via a view screen virtual reality object). In this way, the call placing party may view a representation of the call receiving party while viewing virtual reality environment 220 despite user device 250 not being connected to virtual reality environment 220.

In some implementations, virtual reality server 230 may provide information associated with representing the call receiving party within a different virtual reality environment 220. For example, virtual reality server 230 may cause the virtual reality environment 220 being provided to the call placing party (e.g., a particular virtual reality environment associated with providing a concert experience) to be changed to a different virtual reality environment 220 (e.g., a particular virtual reality environment associated with a conference room). In some implementations, virtual reality server 230 may change virtual reality environment 220 based on an indication from the call placing party, an indication from the call receiving party, a stored configuration, or the like.

In some implementations, virtual reality server 230 may provide information associated with representing multiple users. For example, when virtual reality server 230 determines that the call is a conference call, virtual reality server 230 may configure virtual reality environment 220 to provide a conference room environment, and may provide information associated with establishing a set of avatars for a set of call receiving parties associated with the conference call.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. FIGS. 7A-7E show an example of placing a call within a virtual reality environment and connecting the call via a telephone network.

Figure 7A:
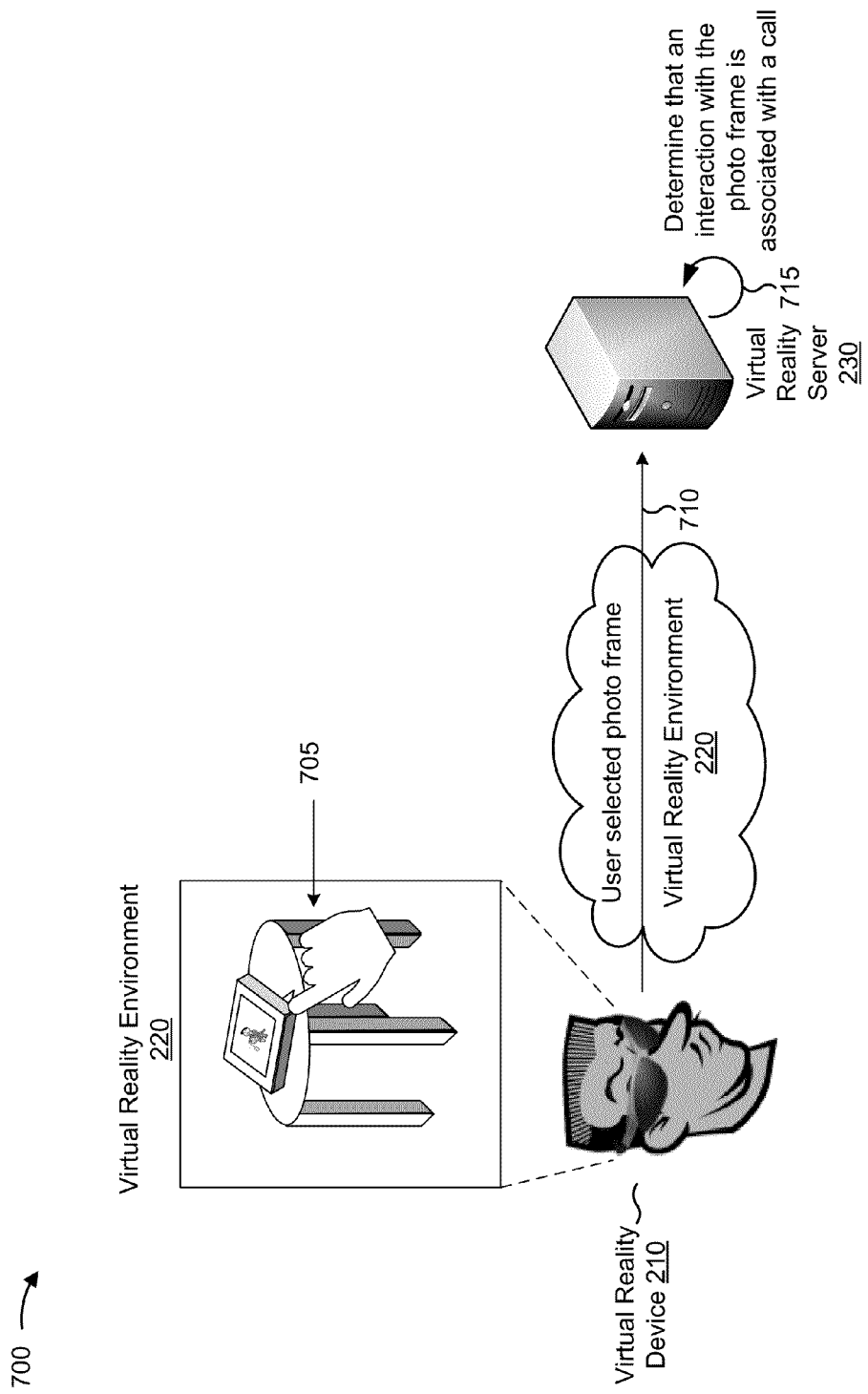

As shown in FIG. 7A, assume a call placing party (e.g., "Adam") is viewing virtual reality environment 220 via virtual reality device 210. As shown by reference number 705, the call placing party interacts with a photo frame (e.g., a particular virtual reality object). As shown by reference number 710, virtual reality server 230 detects a user interaction with the photo frame based on monitoring virtual reality environment 220. As shown by reference number 715, virtual reality server 230 determines that the user interaction with the photo frame is associated with placing a call.

As shown in FIG. 7B, and by reference number 720, virtual reality server 230 includes access to a data structure storing user information regarding particular users connected to virtual reality environment 220. As shown by reference number 725, virtual reality server 230 accesses the data structure to determine first connection information (e.g., a first phone number, "(555) 867-5309") for the call placing party (e.g., "Adam").

As shown in FIG. 7C, and by reference number 730, virtual reality server 230 includes access to another data structure storing information regarding associations between virtual reality objects and particular call receiving parties. As shown by reference number 735, virtual reality server 230 accesses the other data structure to determine second connection information (e.g., a second phone number, "(555) 632-4377") for the call receiving party (e.g., "Edna") based on the user interaction with the photo frame object.

Figure 7D:
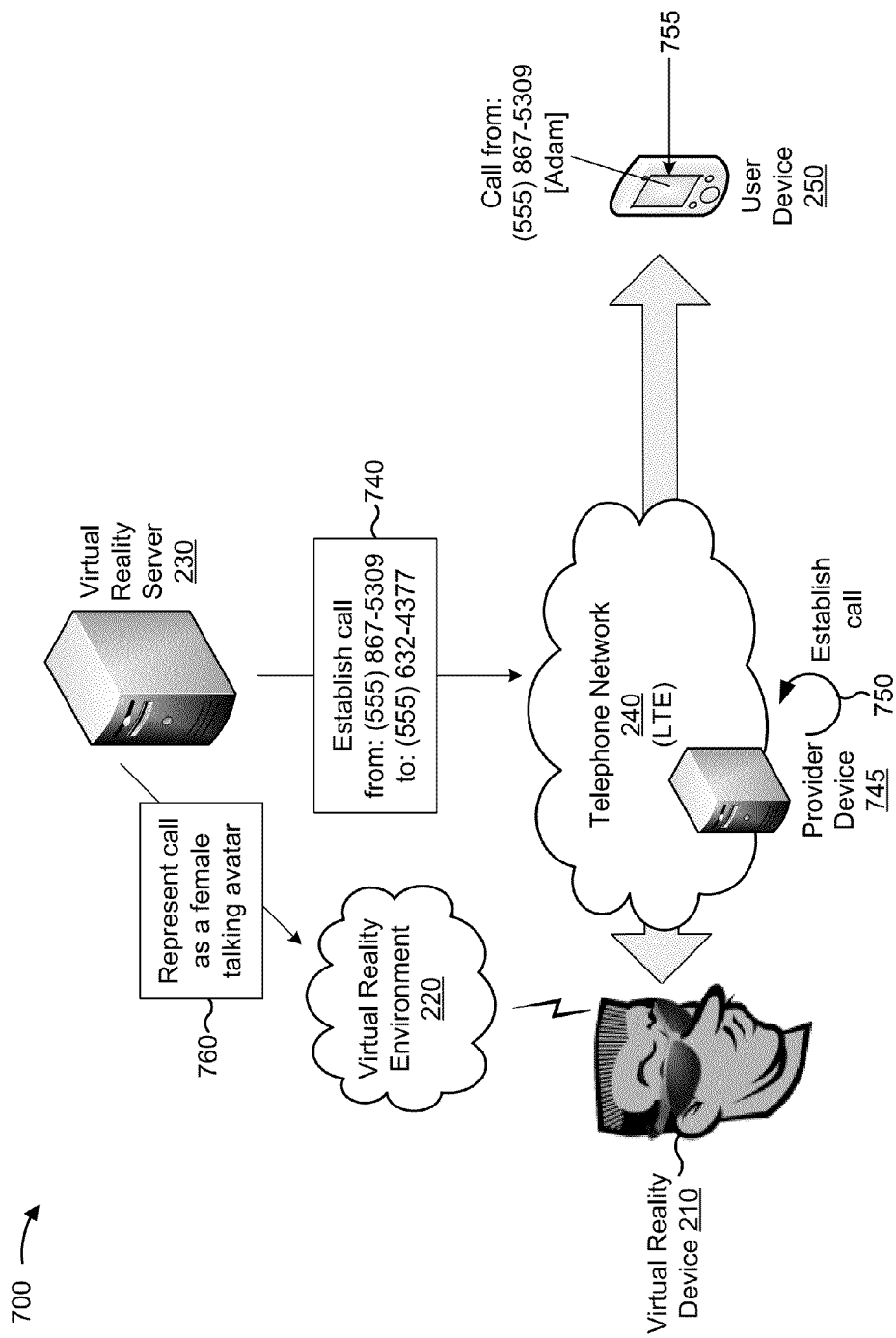

As shown in FIG. 7D, and by reference number 740, virtual reality server 230 provides the first connection information and the second connection information (e.g., the first phone number and the second phone number) to provider device 745 (e.g., a device associated with establishing calls for telephone network 240, which takes the form of an LTE network in this example). As shown by reference number 750, provider device 745 establishes the call between virtual reality device 210 and user device 250 via telephone network 240. As shown by reference number 755, based on the call being established, user device 250 indicates that there is an incoming call from the call placing party, Adam. As shown by reference number 760, virtual reality server 230 provides information instructing virtual reality environment 220 to represent the call receiving party "as a talking avatar." In another example, the call may be routed from virtual reality device 210 through virtual reality environment 220 to virtual reality server 230, and then from virtual reality server 230 through telephone network 240 to user device 250.

Figure 7E:
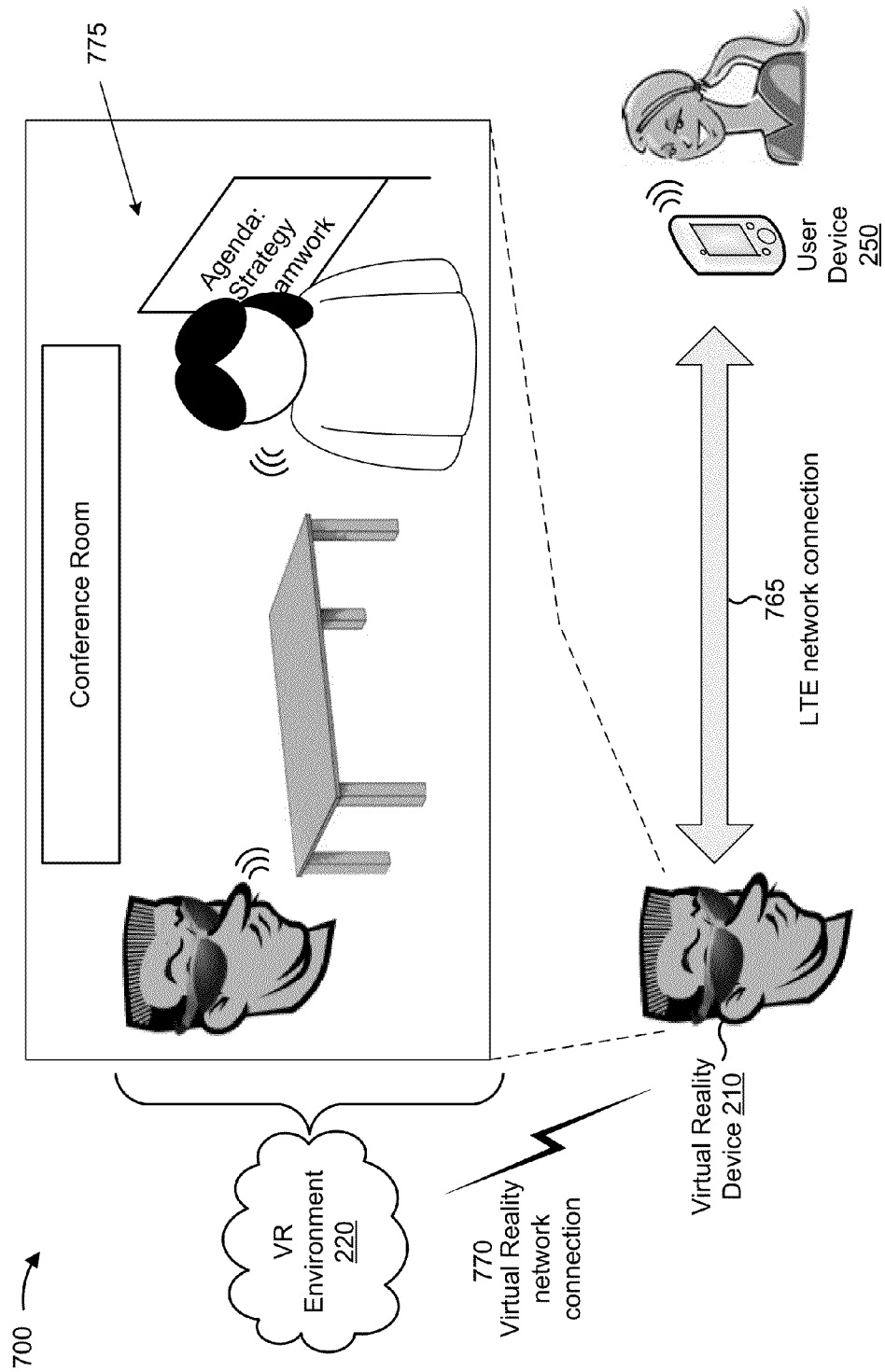

As shown in FIG. 7E, and by reference number 765, virtual reality device 210 is connected to user device 250 via an LTE network connection (e.g., via telephone network 240). As shown by reference number 770, virtual reality device 210 is also connected to virtual reality environment 220 via a virtual reality network connection (e.g., an internet connection). As shown by reference number 775, the call placing party may view the talking avatar of the call receiving party via a conference room environment in virtual reality environment 220.

As indicated above, FIGS. 7A-7E are provided merely as an example. Other examples are possible and may differ from what was described with regard to FIGS. 7A-7E.

In this way, a user utilizing a virtual reality environment may place a call within the virtual reality environment to another user, and the call may be routed via a telephone network, thereby obviating the need for the other user to also connect to the virtual reality environment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
provide information for a virtual reality environment to a virtual reality device,
the virtual reality device being operated by a first party;

determine that the first party of the virtual reality device is placing a call to a second party from within the virtual reality environment;
determine connection information associated with the first party and the second party; and
cause the call to be established between the virtual reality device and a second party device associated with the second party via a telephone network using the connection information and without the second party device connecting to the virtual reality environment,
the telephone network being located external to the virtual reality environment, and
the second party device connecting to the telephone network without connecting to the virtual reality environment.

2. The device of claim 1, where the one or more processors are further to:
determine information associated with representing the second party within the virtual reality environment; and
provide the information associated with representing the second party within the virtual reality environment to the virtual reality device.

3. The device of claim 1,
where the one or more processors, when providing the information for the virtual reality environment, are to:
determine that the virtual reality device has been activated;
receive information identifying the first party of the virtual reality device; and
provide information for the virtual reality environment to the virtual reality device based on the information identifying the first party of the virtual reality device; and
where the one or more processors, when determining the connection information associated with the first party, are to:
determine the connection information based on the information identifying the first party of the virtual reality device.

4. The device of claim 1, where the one or more processors are further to:
identify a particular virtual reality object;
determine particular connection information associated with the second party; and
store information identifying an association between the particular virtual reality object and the particular connection information associated with the second party.

5. The device of claim 4,
where the one or more processors are further to:
detect a user interaction with the particular virtual reality object from within the virtual reality environment; and
where the one or more processors, when determining that the first party of the virtual reality device is placing the call to the second party from within the virtual reality environment, are to:
determine that the first party of the virtual reality device is placing the call based on the user interaction with the particular virtual reality object.

6. The device of claim 4, where the one or more processors, when determining the connection information, are to:
determine the connection information based on the particular connection information associated with the second party.

7. The device of claim 4, where the one or more processors when determining the particular connection information associated with the second party, are to:
request information associated with the second party from the first party of the virtual reality device;
receive, based on requesting the information associated with the second party, a phone number associated with the second party; and
determine the particular connection information based on the phone number associated with the second party.

8. A non-transitory computer-readable medium storing instructions, the instructions comprising:
one or more instructions that, when executed by one or more processors, cause the one or more processors to:
detect that a virtual reality object is selected, by a first party, within a virtual reality environment,
the first party being connected to the virtual reality environment using a virtual reality device;
determine that the virtual reality object is associated with placing a call to a second party;
determine connection information regarding the second party;
cause the call to be established between the first party and the second party via a telephone network using the connection information,
the telephone network being different from and independent of the virtual reality environment; and
provide information associated with representing the second party via the virtual reality environment during the call.

9. The non-transitory computer-readable medium of claim 8,
where the one or more instructions, when executed by the one or more processors, further cause the one or more processors to:
provide the connection information to one or more devices associated with the telephone network; and
where the one or more instructions, that cause the one or more processors to cause the call to be established, cause the one or more processors to:
cause the call to be established via the telephone network based on providing the connection information to the one or more devices associated with the telephone network.

10. The non-transitory computer-readable medium of claim 8, where the one or more instructions, that cause the one or more processors to cause the call to be established, cause the one or more processors to:
provide information indicating that the call has been established to at least one of the first party or the second party.

11. The non-transitory computer-readable medium of claim 8,
where the one or more instructions, when executed by the one or more processors, further cause the one or more processors to:
detect a first user interaction, with the virtual reality object, being performed by the first party via the virtual reality device from within the virtual reality environment;
receive information identifying the second party from the first party; and
store information identifying an association between the virtual reality object and the information identifying the second party; and
where the one or more instructions, that cause the one or more processors to determine that the virtual reality object is associated with placing the call to the second party, cause the one or more processors to:
determine that the virtual reality object is associated with placing the call to the second party based on the stored information identifying the association between the virtual reality object and the information identifying the second party.

12. The non-transitory computer-readable medium of claim 8,
where the one or more instructions, when executed by the one or more processors, further cause the one or more processors to:
determine one or more attributes associated with generating a computer rendering of the second party; and
where the one or more instructions, that cause the one or more processors to provide the information associated with representing the second party, cause the one or more processors to:
provide information identifying the one or more attributes associated with generating the computer rendering of the second party.

13. The non-transitory computer-readable medium of claim 8, where the one or more instructions, that cause the one or more processors to provide the information associated with representing the second party, cause the one or more processors to:
provide an image of the second party for display within the virtual reality environment.

14. The non-transitory computer-readable medium of claim 8, where the one or more instructions, that cause the one or more processors to provide the information associated with representing the second party, cause the one or more processors to:
determine that the second party is providing a video-stream to the first part; and
configure the virtual reality environment to provide the video-stream for display to the first party via the virtual reality environment.

15. A method, comprising:
determining, by a device, that a first user of a virtual reality device is attempting to place a call within a virtual reality environment to a second user,
the second user being associated with a user device that is not connected to the virtual reality environment;
determining, by the device, connection information associated with the first user and the second user;
causing, by the device, the call to be connected between the virtual reality device and the user device using the connection information and without the user device connecting to the virtual reality environment,
the call being connected via a telephone network, and
the telephone network being independent of the virtual reality environment; and
providing, by the device, information associated with representing the second user within the virtual reality environment during the call.

16. The method of claim 15, further comprising:
determining one or more attributes associated with generating a computer representation of the second user; and
generating the computer representation of the second user based on the one or more attributes,
where providing the information associated with representing the second user within the virtual reality environment comprises:
causing the computer representation of the second user to be displayed, to the first user, within the virtual reality environment.

17. The method of claim 15, further comprising:
identifying a virtual reality object to be associated with placing the call to the second user; and
storing, via a particular data structure, information identifying an association between the virtual reality object and placing the call to the second user,
where determining that the first user is attempting to place the call further comprises:
detecting that the first user interacts with the virtual reality object;
receiving information from the particular data structure identifying the second user based on detecting that the first user interacts with the virtual reality object; and
determining the connection information based on the information identifying the second user.

18. The method of claim 15, further comprising:
determining that the second user is capable of accessing the virtual reality environment;
receiving an indication that the second user has accepted the call from the first user; and
causing the second user to connect to the virtual reality environment based on determining that the second user is capable of accessing the virtual reality environment and receiving the indication that the second user has accepted the call,
the user device being connected to the virtual reality environment.

19. The method of claim 15, further comprising:
receiving an image of the second user,
where providing the information associated with representing the second user within the virtual reality environment during the call comprises:
providing the image of the second user.

20. The method of claim 15,
where determining the connection information further comprises:
requesting information identifying the first user and the second user; and
receiving, from the first user and based on requesting the information identifying the first user and the second user, information identifying a first telephone number for the first user and a second telephone number for the second user; and
where causing the call to be established comprises:
providing the first telephone number and the second telephone number to one or more devices associated with the telephone network.

\* \* \* \* \*